(12) United States Patent
Betzin et al.

(10) Patent No.: US 10,566,803 B2
(45) Date of Patent: Feb. 18, 2020

(54) VIRTUAL POWER PLANT

(71) Applicant: Siemens Aktiengesellschaft, Munich (DE)

(72) Inventors: Christopher Betzin, Forchheim (DE); Matthias Simon Lepiorz, Neustadt a. d. Aisch (DE); Holger Wolfschmidt, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 53 days.

(21) Appl. No.: 15/540,781

(22) PCT Filed: Dec. 9, 2015

(86) PCT No.: PCT/EP2015/079099
§ 371 (c)(1),
(2) Date: Jun. 29, 2017

(87) PCT Pub. No.: WO2016/113042
PCT Pub. Date: Jul. 21, 2016

(65) Prior Publication Data
US 2017/0373509 A1    Dec. 28, 2017

(30) Foreign Application Priority Data
Jan. 15, 2015  (DE) .................. 10 2015 200 569

(51) Int. Cl.
*H02J 7/00* (2006.01)
*H02J 3/28* (2006.01)
*G05B 15/02* (2006.01)

(52) U.S. Cl.
CPC ............ *H02J 7/0014* (2013.01); *G05B 15/02* (2013.01); *H02J 3/28* (2013.01)

(58) Field of Classification Search
CPC ... H02J 7/0014; H02J 3/28; H02J 3/32; G05B 15/02; B60L 11/1844
(Continued)

(56) References Cited

U.S. PATENT DOCUMENTS

| 7,609,031 B2 | 10/2009 | Benckenstein et al. ...... 320/118 |
| 2004/0114290 A1* | 6/2004 | Kehrli ........................ H02J 3/06 361/84 |

(Continued)

FOREIGN PATENT DOCUMENTS

| JP | WO 2014/103218 | * 7/2014 | ................ H02J 7/00 |
| WO | 2012/130400 A1 | 10/2012 | ................ H02J 7/00 |
| WO | 2016/113042 A1 | 7/2016 | ................ H02J 3/28 |

OTHER PUBLICATIONS

Lu, Xiaonan et al., "State-of-Charge Balance Using Adaptive Droop Control for Distributed Energy Storage Systems in DC Microgrid Applications," IEEE Transactions on Industrial Electronics, vol. 61, No. 6, pp. 2804-2815, Jun. 2014.
(Continued)

*Primary Examiner* — Rocio Del Mar Perez-Velez
*Assistant Examiner* — Alicia M. Choi
(74) *Attorney, Agent, or Firm* — Slayden Grubert Beard PLLC

(57) ABSTRACT

The teachings of the present disclosure may be employed for buffering electric power in a virtual storage power plant. For example, a virtual power plant for buffering electric power may include: distributed electrical energy storage systems electrically interconnected by transmission lines of an electrical power plant network; a measuring device detecting a state of charge of each of the storage systems; and a control device adjusting the states of charge between a lower limit and an upper limit. The states of charge are adjusted as needed by means of a charge equalization including transmitting electrical equalization charges from energy storage
(Continued)

systems having a relatively high state of charge to energy storage systems having a relatively low state of charge, via the electrical power plant network.

20 Claims, 1 Drawing Sheet

(58) Field of Classification Search
USPC .......................................................... 700/295
See application file for complete search history.

(56) References Cited

U.S. PATENT DOCUMENTS

| | | | | |
|---|---|---|---|---|
| 2007/0090811 | A1* | 4/2007 | Labuschagne | G05F 1/70 |
| | | | | 323/217 |
| 2008/0055940 | A1* | 3/2008 | Lawson | H02M 1/10 |
| | | | | 363/16 |
| 2012/0250775 | A1* | 10/2012 | Anastasov | H04B 15/04 |
| | | | | 375/259 |
| 2012/0316691 | A1* | 12/2012 | Boardman | H02J 3/26 |
| | | | | 700/293 |
| 2013/0020997 | A1* | 1/2013 | Iwasawa | H01M 10/441 |
| | | | | 320/116 |
| 2013/0134943 | A1 | 5/2013 | Maloizel et al. | 320/118 |
| 2014/0009117 | A1 | 1/2014 | Ishii et al. | 320/126 |
| 2014/0025218 | A1 | 1/2014 | Nishi et al. | 700/295 |
| 2014/0152232 | A1* | 6/2014 | Johnson | H02J 7/0014 |
| | | | | 320/103 |
| 2014/0300323 | A1* | 10/2014 | Gibbs | H02J 7/0014 |
| | | | | 320/116 |
| 2014/0379151 | A1* | 12/2014 | Tokuda | H02J 3/32 |
| | | | | 700/287 |
| 2016/0079755 | A1* | 3/2016 | Triebel | H02J 3/32 |
| | | | | 307/52 |
| 2016/0099568 | A1* | 4/2016 | Gersch | H02J 3/32 |
| | | | | 307/20 |
| 2016/0156202 | A1* | 6/2016 | Kim | H01M 10/441 |
| | | | | 320/134 |
| 2016/0329710 | A1* | 11/2016 | Clifton | G05F 1/66 |
| 2018/0166875 | A1* | 6/2018 | Oldham, Jr. | H02H 5/105 |

OTHER PUBLICATIONS

German Office Action, Application No. 102015200569.0, 7 pages, dated Sep. 14, 2015.
International Search Report and Written Opinion, Application No. PCT/EP2015/079099, 12 pages, dated Mar. 1, 2016.

* cited by examiner

VIRTUAL POWER PLANT

CROSS-REFERENCE TO RELATED APPLICATIONS

This application is a U.S. National Stage Application of International Application No. PCT/EP2015/079099 filed Dec. 9, 2015, which designates the United States of America, and claims priority to DE Application No. 10 2015 200 569.0 filed Jan. 15, 2015, the contents of which are hereby incorporated by reference in their entirety.

TECHNICAL FIELD

The present disclosure relates to virtual power plants. The teachings thereof may be embodied in a system and a method for buffering electric power or electrical energy for electrical loads in configuration of a virtual storage power plant.

BACKGROUND

In the course of changing energy policy in Germany, the generation of electricity from wind energy increased by a factor of 5 and from photovoltaics by a factor of 150, between 2001 and 2011. For the alignment of electricity generation from fluctuating and decentralized energy sources with electricity demand, stationary energy stores are increasingly prevalent. In response to increasing demand for stationary energy stores, 100,000 domestic solar storage batteries are expected to be installed by 2018 in Germany alone.

For an optimum exploitation of the storage capacity of individual energy stores, these may be combined to form a virtual power plant. At present, projects for the combination of decentrally dispersed electrical energy storage systems to form a virtual power plant are only at the preliminary development or trial stages. Conventionally, balancing systems at individual storage system level or battery module level are known.

U.S. Pat. No. 7,609,031 B2 discloses a method for the balancing of secondary lithium cells and modules. A battery stack control module is disclosed for the balancing of a plurality of secondary lithium cells or groups of secondary lithium cells which are electrically connected in series.

US 2013/0134943 A1 discloses a method for balancing of a battery having a plurality of parallel-connected branches, wherein each branch comprises at least two electrochemical cells which are connected in series.

WO 2012/130400 A1 discloses a circuit arrangement for the exchange of electrical charge between the interior cells of an accumulator block arrangement, wherein an accumulator block, via its external connection terminals, is interconnected with a plurality of accumulator blocks in an accumulator block arrangement.

SUMMARY

The teachings of the present disclosure may provide a system and a method for the delivery of electric power for electrical loads, configured as a virtual storage power plant with a buffer between, in particular fluctuating and decentralized, energy sources and electrical loads. The electrical capacities of the electrical energy storage systems employed may be optimally exploited, and not disconnected from a power plant network, such that the availability thereof for service remains unrestrictedly available at all times. In some embodiments, electrical energy is buffered, and electrical working capacity is ensured by the adjustment of advantageous states of charge.

For example, a virtual power plant (K) for the buffering of electric power, in particular control power, for electrical loads, may include a plurality of spatially distributed electrical energy storage systems (S1 . . . Sn), which are electrically interconnected by means of an electrical power plant network (KN). The virtual power plant (K) may include a measuring device (1) configured for the detection of the states of charge (SOC) of all the energy storage systems (S1 . . . Sn) for a control device (3) for adjusting all the states of charge between a lower state of charge limit GU and an upper state of charge limit GO. All the states of charge are adjusted by means of a charge equalization wherewith, by means of balancing, electrical equalization charges are transmitted from energy storage systems having a relatively high state of charge to energy storage systems having a relatively low state of charge, via the electrical power plant network (KN).

In some embodiments, the measuring device (1) for the control device (3) is additionally configured for the detection of the equalization charges, which are transmitted by means of lines (Li-j) of the electrical power plant network (KN) which electrically interconnect the energy storage systems (S1 . . . Sn) in pairs.

In some embodiments, the control device (3) executes a balancing between energy storage systems (S1 . . . Sn) by means of lines (Li-j) which, prior to said balancing, had transmitted relatively low equalization charges.

In some embodiments, the balancing power transmitted by equalization charges per line (Li-j) of the electrical power plant network (KN) is a maximum of 15%, in particular a maximum of 5%, of the respective maximum capacity of the line (Li-j).

In some embodiments, the balancing power transmitted by equalization charges per line (Li-j) of the electrical power plant network (KN) is a maximum of 15%, in particular a maximum of 5%, of the respective maximum capacity of the energy storage system.

In some embodiments, the control device (3) adjusts a maximum storage capacity of all the energy storage systems (S1 . . . Sn) in a continuous manner.

In some embodiments, the control device (3) prevents critical ranges for states of charge for all the energy storage systems (S1 . . . Sn), in particular ranges for states of charge which accelerate ageing.

In some embodiments, the measuring device (1) and the control device (3) are configured as a cloud system.

In some embodiments, each energy storage system (S1 . . . Sn) is associated with an electrical load, to which the control device (3) routes in total the energy delivered by the energy storage system during discharging.

In some embodiments, the measuring device (1) is additionally configured for the detection of the amount of energy delivered in total of each energy storage system (S1 . . . Sn) during balancing.

In some embodiments, the control device (3) raises a lower state of charge limit GU by means of a restraining value set on an energy storage system.

In some embodiments, the control device (3) reduces an upper state of charge limit GO by means of a buffer value set on an energy storage system.

In some embodiments, the control device (3) uses a mathematical algorithm for the balancing.

In some embodiments, the control device (3) considers predictive calculations for the balancing.

In some embodiments, the control device (3) considers time-dependent power utilization curves of the electrical loads for the balancing.

As another example, some embodiments may include a method for operating a virtual power plant (K) for the buffering of electric power, in particular control power, for electrical loads, comprising a plurality of spatially distributed electrical energy storage systems (S1 . . . Sn), which are electrically interconnected by means of an electrical power plant network (KN). The methods may include a measuring device (1) configured for the detection (ST1) of the states of charge (SOC) of all the energy storage systems (S1 . . . Sn) for a control device (3) for adjusting (ST2) all the states of charge between a lower state of charge limit GU and an upper state of charge limit GO, wherein all the states of charge are adjusted by means of a charge equalization wherewith, by means of balancing, electrical equalization charges are transmitted from energy storage systems having a relatively high state of charge to energy storage systems having a relatively low state of charge, via the electrical power plant network (KN).

In some embodiments, the measuring device (1) for the control device (3) is additionally configured for the detection of the equalization charges, which are transmitted by means of lines (Li-j) of the electrical power plant network (KN) which electrically interconnect the energy storage systems (S1 . . . Sn) in pairs.

In some embodiments, the control device (3) executes a balancing between energy storage systems (S1 . . . Sn) by means of lines (Li-j) which had a relatively low level of loading prior to said balancing.

In some embodiments, the balancing power transmitted by equalization charges per line (Li-j) of the electrical power plant network (KN) is a maximum of 15%, in particular a maximum of 5%, of the respective maximum capacity of the line (Li-j).

In some embodiments, the balancing power transmitted by equalization charges per line (Li-j) of the electrical power plant network (KN) is a maximum of 15%, in particular a maximum of 5%, of the respective maximum capacity of the energy storage system.

In some embodiments, the control device (3) adjusts a maximum storage capacity of all the energy storage systems (S1 . . . Sn) in a continuous manner.

In some embodiments, the control device (3) prevents critical ranges for states of charge for all the energy storage systems (S1 . . . Sn), in particular ranges for states of charge which accelerate ageing.

In some embodiments, the measuring device (1) and the control device (3) are configured as a cloud system.

In some embodiments, each energy storage system (S1 . . . Sn) is associated with an electrical load, to which the control device (3) routes in total the energy delivered by the energy storage system during balancing, and specifically during discharging.

In some embodiments, the measuring device (1) is additionally configured for the detection of the amount of energy delivered in total during balancing of each energy storage system (S1 . . . Sn).

In some embodiments, the control device (3) raises the lower state of charge limit GU by means of a restraining value.

In some embodiments, the control device (3) reduces the upper state of charge limit GO by means of a buffer value.

In some embodiments, the control device (3) uses a mathematical algorithm for the balancing.

In some embodiments, the control device (3) considers predictive calculations for the balancing.

In some embodiments, the control device (3) considers time-dependent power utilization curves of the electrical loads for the balancing.

BRIEF DESCRIPTION OF THE DRAWINGS

The teachings are described in greater detail hereinafter with respect to exemplary embodiments and with reference to the figures. Herein.

DETAILED DESCRIPTION

Figure 1:
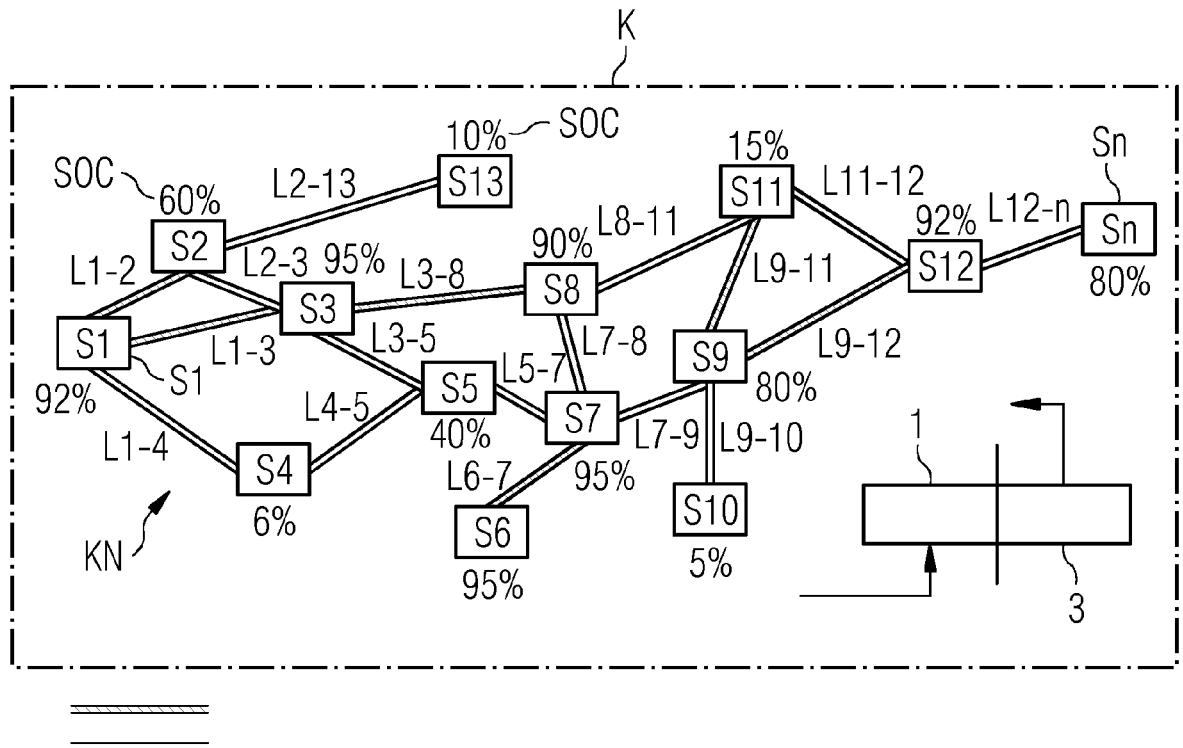
FIG. 1 shows an exemplary embodiment of a virtual power plant according to the teachings of the present disclosure.

Some embodiments may include a virtual power plant system for the buffering of electric power, in particular control power, for electrical loads. The virtual power plant may comprise a plurality of spatially distributed electrical energy storage systems, which are electrically interconnected, or linked to each other, by means of an electrical power plant network. The power plant may also include a measuring device configured for the detection of the states of charge of all the energy storage systems and a control device for adjusting all the states of charge between a lower state of charge limit GU and an upper state of charge limit GO. All the states of charge may be adjusted by means of a charge equalization wherewith, by means of balancing, electrical equalization charges are transmitted from energy storage systems having a relatively high state of charge to energy storage systems having a relatively low state of charge, via the electrical power plant network.

In some embodiments, a method may be used for operating a virtual power plant system for the buffering of electrical energy and thereby for ensuring electrical working capacity, in particular control power, for electrical loads, comprising a plurality of spatially distributed electrical energy storage systems, which are electrically interconnected or linked to each other, by means of an electrical power plant network. In the method, a measuring device is configured for the detection of the states of charge of all the energy storage systems for a control device for adjusting all the states of charge between a lower state of charge limit GU and an upper state of charge limit GO, wherein all the states of charge are adjusted by means of a charge equalization wherewith, by means of balancing, electrical equalization charges are transmitted from energy storage systems having a relatively high state of charge to energy storage systems having a relatively low state of charge, via the electrical power plant network.

A virtual power plant can be an apparent power plant, wherein a plurality of decentralized electrical energy storage systems are electrically interconnected by means of an electrical power plant network, and can deliver electric power, in particular control power, for electrical loads. In principle, a virtual power plant can also be a combination of electrical loads, generators, and storage facilities, which are all centrally controlled together.

An electrical energy storage system may include, for example, a domestic solar storage battery, which can store self-generated solar energy. In principle, all energy storage systems can be used, which are capable of the storage, or intermediate storage, of electrical energy (e.g., regeneratively generated electrical energy). Each energy storage system can be associated with an energy source, e.g., a decentralized regenerative energy source, which charges the energy storage system. Each energy storage system can be associated with an electrical load, which discharges the energy storage system.

Herein, buffering in particu signifies an adjustment or adaptation of electric power from energy sources, in particular from fluctuating and decentralized energy sources, to the electrical capacity of a power supply network to which electrical loads are electrically connected. In particular, this involves power buffering, wherein electric power is tapped or injected, in accordance with power demand.

The power plant network of the virtual power plant can be part of the power supply network for electrical loads. By means of the power supply network, electric power, in particular control power of a specific amplitude and frequency, can be delivered to electrical loads.

In some embodiments, the measuring device for the detection of the states of charge of all the energy storage systems, and the control device for adjusting all the states of charge, are superordinate to the energy storage systems and electrical lines.

For an optimum exploitation of the storage capacity of individual energy storage systems, the latter are combined to form a virtual power plant. According to the teachings herein, the combination of the dispersed electrical energy storage systems to form a virtual power plant employs superordinate control and regulation instructions delivered by a superordinate control device. It has been observed that the storage capacities of virtual power plant, for example control power, is not possible to an equal extent at all times. As a result of varying site and environmental conditions, e.g., the magnitude of locally installed capacity, or from power delivered regenerative energy generation, or an individual varying energy consumption, of the dispersed electrical energy storage systems, the states of charge (SOC) thereof will vary.

If individual energy storage facilities or energy storage systems of the virtual power plant undershoot a specified lower state of charge limit GU, the availability for service will be eliminated, or subject to restriction. The same applies to an overshoot of an upper state of charge limit value GO. The non-consideration by the control device of the virtual power plant of electrical energy from like systems, having states of charge in excess of the state of charge limit GO or having states of charge below the state of charge limit GU, in the delivery of positive or negative storage capacity, is prevented. For example, if a maximum available electrical capacity of the virtual power plant, as a result of the switching-out of the relevant energy storage systems, undershoots a limiting value of, for example, 5 MW, under conditions in force as at June 2012, the virtual power plant can no longer participate in a market for control power.

In some embodiments, a superordinate control unit or control device continuously monitors and analyzes the state of charge of dispersed energy storage systems and, in the event or the overshoot or undershoot of the state of charge limits GO and GU respectively, restores the state of charge to the working state of charge. This control or regulation system functions analogously to an active balancing system. Charge equalization between individual, dispersed, energy storage systems, which are combined in large interconnected systems may form a virtual power plant. In this manner, energy storage systems are excluded if the respective states of charge lie outside the range for full provision of capacity, and can therefore not be considered, or only partially considered, for the provision of storage capacities.

By the active nature of the energy balancing between electrical energy storage systems in a virtual power plant according to the invention, all the energy storage systems achieve the state of charge range which is required for the full provision of capacity. A virtual power plant can thus participate in the market with the maximum possible storage capacity, thereby generating a financial added value and reliable security of planning.

In some embodiments, the measuring device for the control device may detect the equalization charges transmitted by the lines of the electrical power plant network which electrically interconnect energy storage systems in pairs. For the execution of equalization charges, there need not be any direct line connection between the energy storage systems to be balanced. Rather, the concept behind the equalization charge involves the injection of electrical energy into the power plant network from an energy storage system having a relatively high state of charge, and the tapping of electrical energy from the power plant network by an energy storage system having a relatively low state of charge. An energy exchange can not only be executed bidirectionally, but also via further intermediate lines or a plurality of intermediate lines connected to storage facilities.

In some embodiments, the control device balances between energy storage systems by means of lines which had a relatively low level of loading prior to said balancing. For the lines that can be used, a ranking order can be established with respect to their present loading or equalizing charges requiring present transmission, wherein the lines with the lowest loading can be employed first for balancing power transmissions. Present loading can be electrical capacity requiring present transmission. A ranking order can be established in accordance with the loading of lines, wherein a relatively high loading can clearly be identified in relation to a relatively low loading.

In some embodiments, the balancing power transmitted by equalization charges between energy storage facilities or energy storage systems (per line of the electrical power plant network) can be a maximum of 15%, e.g., a maximum of 5%, of the respective maximum capacity of the energy storage facilities or energy storage systems. In this case, the percentage figure relates to the maximum current on the energy storage system. Moreover, lines may be preferred if they carry a partial load only, and are used with a maximum of 15%, e.g., a maximum of 5%, of the respective maximum capacity of the line.

In some embodiments, the control device adjusts a maximum storage capacity of all the energy storage systems in a continuous manner. In some embodiments, the control device prevents critical ranges for states of charge for all the energy storage systems, in particular ranges for states of charge which accelerate ageing.

In some embodiments, the measuring device and the control device may comprise a cloud system.

In some embodiments, each energy storage system can be associated with an electrical load, to which the control device routes in total the energy delivered by the energy storage system during balancing, and specifically during discharging.

In some embodiments, the measuring device may detect the amount of energy delivered in total of each energy storage system during balancing.

In some embodiments, the control device raises the lower state of charge limit GU by means of a restraining value. In some embodiments, the control device reduces the upper state of charge limit GO by means of a buffer value. The control device can use a mathematical algorithm for the balancing. In some embodiments, the control device considers predictive calculations for the balancing. In some embodiments, the control device considers time-dependent power utilization curves of the electrical loads for the balancing.

FIG. 1 shows an exemplary embodiment of a virtual power plant K according to the teachings of the present disclosure. A control device 3 may continuously detect the states of charge of the individual, decentrally dispersed electrical energy storage systems S1 . . . Sn and, by means of an optimized control algorithm, transfer electrical energy from energy storage systems having a high state of charge to energy storage systems having a low state of charge. This process is described as balancing.

To this end, the control device 3 of the virtual power plant K determines the states of charge of the energy storage systems S1 . . . Sn, and identifies any for which the state of charge does not lie within the optimum working range. Thereafter, the targeted mutual balancing of the energy storage systems S1 . . . Sn is executed, to achieve an optimum working range. To this end, an algorithm is applied, whereby energy storage systems in the upper range of the state of charge execute the charging of those which are in the lower range of the state of charge.

The primary working range of the energy storage systems can be established, for example, in the range of 20% to 90%. The full availability for service of the individual energy storage systems S1 . . . Sn is ensured as a result. Subject to restrictions, the range can also be extended, e.g., to 10% to 95%. The balancing between individual energy storage systems S1 . . . Sn is executed by the central control device 3, which has access to all the energy storage systems S1 . . . Sn. By the application of an integral or proportional rule, or a combination of the two, the equalization charges for each individual energy storage system S1 . . . Sn are controlled and, at the end of a clearing period, can be mutually offset.

Release for the commencement of balancing is delivered by the control device 3. The latter detects those states of charge of individual energy storage systems S1 . . . Sn in the virtual power plant K which do not lie within the optimum working range. Thereafter, by means of the control device 3, the individual energy storage systems S1 . . . Sn are mutually balanced, to achieve an optimum working range for the state of charge. Further exemplary embodiments of the virtual power plant K can be controlled by means of the central control device 3 such that, as example criteria, energy storage systems having a state of charge lower than 20% cannot be discharged any further, energy storage systems having a state of charge exceeding 95% cannot be charged any further, energy storage systems having a minimum voltage at an individual cell level of U nominal −300 mV or U minimum +500 mV cannot be discharged any further and/or energy storage systems having a maximum voltage at individual cell level of U maximum −50 mV cannot be charged any further.

FIG. 1 shows a schematic representation of a combination of decentrally dispersed electrical energy storage systems S1 . . . Sn to form the virtual power plant K in an electrical power plant network with variable localized loading, wherein two energy storage systems respectively are mutually electrically interconnected in pairs by electric lines Li-j. The percentage figures indicate the respective state of charge of an energy storage system Si. In this figure, the lines Li-j of the electrical power plant network KN which are heavily loaded are also represented with hatching.

The control device 3 may continuously detect local loading of the electrical power plant network KN between all the energy storage systems S1 . . . Sn. Balancing between the individual energy storage systems can be executed via lines Li-j which temporarily carry a low load. These lines are represented with no additional hatching. By means of this balancing, an optimum and network-protective charge equalization can be ensured.

Various balancing currents can flow between the individual energy storage systems S1 . . . Sn, which depend on a local loading of the electrical power plant network KN and the corresponding lines Li-j. Additionally, an optimized control algorithm can select the individual energy storage systems S1 . . . Sn for a balancing such that local regions of the electrical power plant network KN are loaded to the lowest possible extent. In principle, the electrical power plant network KN can be configured by a general power supply network. In principle, the power plant network KN and a general electric power supply network can be coupled in a simple manner.

The electric currents flowing for the purposes of charge equalization may represent less than 5% of the maximum possible currents, in order to prevent any accelerated ageing of a corresponding energy storage system S1 . . . Sn. This likewise includes currents of variable magnitude, which can be adjusted in accordance with local network load conditions. The currents flowing may lie below 0.05 C. In some embodiments, balancing powers are thus transmitted at a maximum of 0.05 C, wherein this corresponds to 5% of a maximum capacity of an energy storage system. In marginal regions, the balancing power can be increased up to 0.15 C wherein, in the interests of rapid action, no restrictions on capacity need to be stipulated.

For safety reasons, control by means of the measuring device 1 and the control device 3, at storage device temperatures of T>50° C. and T<−10° C., can be limited to 0.15 C. In some embodiments, at storage device temperatures of T>55° C. and T<−15° C., the permissible figure is limited to just 0.05 C. In principle, the measuring device 1 and the control device 3 do not seek an equal state of charge on all the energy storage systems S1 . . . Sn, but rather an optimum operating strategy is applied which ensures the safeguarding of the maximum storage capacity for the virtual power plant K.

The teachings of the present disclosure may be employed to reach full availability of the storage capacity of the virtual power plant K at any time. Moreover, the algorithm for control device 3 can be configured such that critical ranges for states of charge (SOC range), in which an accelerated ageing of energy storage systems S1 . . . Sn is anticipated, are prevented. By the prevention of these critical ranges for states of charge, the ageing of the respective energy storage systems S1 . . . Sn is additionally minimized by the equalization charges between the energy storage systems S1 . . . Sn.

The superordinate measuring device 1, with the superordinate control device 3, may consider and eliminate specific working ranges of the energy storage systems S1 . . . Sn which cause increased ageing by electrochemical processes. These lie, for example, in the range of 30% to 40% for a type A battery, in the range of 55% to 60% for a type B battery, and in the range of 71% to 72% for a type C battery. Correspondingly, the superordinate control device 3 is additionally employed for the adjustment of the states of charge on these batteries of the energy storage systems S1 . . . Sn outside these ranges.

Alternatively or cumulatively, the measuring device 1 and the control device 3 can be configured as a cloud system. The cloud system thus monitors the individual equalization charges, and registers the latter between the individual energy storage systems S1 . . . Sn. Using cloud computing, a virtual state of the individual energy storage systems S1 . . . Sn is established, such that each energy storage system S1 . . . Sn, in total, and in the interests of equality of competition, does not have more or less energy available for the internal consumption in the energy storage system S1 . . . Sn.

Alternatively, at the end of a clearing period, credits can be applied in respect of equalization charges. It is ensured that, in total, each participant either has the self-generated energy from its own energy storage system S1 . . . Sn available, or can be taken into account by a subsequent clearing system of the equalization. Each energy storage system S1 . . . Sn can be connected to an electrical energy generator.

Figure 2:
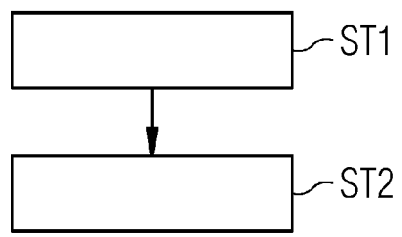
FIG. 2 shows an exemplary embodiment of a method for operating a virtual power plant according to the teachings of the present disclosure.

FIG. 2 shows an exemplary embodiment of a method for operating a virtual power plant K for the buffering of electric power, in particular control power, for electrical loads, comprising a plurality of spatially distributed electrical energy storage systems S1 . . . Sn, which are electrically interconnected by means of an electrical power plant network KN. In a first step ST1, a measuring device 1 detects the states of charge of all the energy storage systems S1 . . . Sn.

The measured values are transmitted to a control device 3 which, in a second step ST2, adjusts or regulates all the states of charge between a lower state of charge limit GU and an upper state of charge limit GO. Control is executed by all the states of charge being adjusted by means of a charge equalization wherewith, by means of balancing, electrical equalization charges are transmitted from energy storage systems having a relatively high state of charge to energy storage systems having a relatively low state of charge, via the electrical power plant network KN. The control device 3 in particular employs an integrated detection algorithm for all the states of charge and line load conditions, together with an optimized control algorithm for the delivery of the maximum electrical capacity on the energy storage systems S1 . . . Sn.

The method also incorporates restraining settings, which can be stipulated by participants on the respective energy storage system S1 . . . Sn, in order to permanently or temporarily prevent the undershoot or overshoot of a state of charge.

Technically, optimization of the provision of capacity by a virtual power plant K consisting of individual, decentrally dispersed electrical energy storage systems is achieved by means of a control device 3, for example in the form of a regulating or control unit, having an integrated detection algorithm for the states detected by means of the measuring device 1, for example states of charge, of the energy storage systems. By the incorporation of predictive mathematical calculations, the virtual power plant K can be configured in a yet more foreseeable and controllable manner.

In the light of the forthcoming deregulation of the electricity market, in particular involving electricity prices which are dependent upon the time of day, it is technically rational for virtual power plants K to be balanced at appropriate times, specifically for example during periods of low loading of local electricity systems, as the continuous provision of storage capacities, for example control power, even in consideration of any financial expenditure associated with the active balancing of the individual energy storage systems, can be a financially more lucrative option.

What is claimed is:

1. A virtual power plant for buffering electric power for electrical loads, the virtual power plant comprising:
    a plurality of spatially distributed electrical energy storage systems electrically interconnected by transmission lines of an electrical power plant network;
    a measuring device detecting a respective state of charge of each of the plurality of electrical energy storage systems, the state of charge of each respective electrical energy storage system representing a percentage charge of a maximum charge value of the respective electrical energy storage system; and
    a control device programmed to identify, from the plurality of electrical energy storage systems, individual electrical energy storage systems have a state of charge to be balanced;
    the control device programmed to determine a measure of loading for each of the plurality of transmission lines;
    the control device programmed to identify a subset of the plurality of transmission lines having a lower measure of loading relative to other ones of the transmission lines; and
    the control device programmed to adjust each state of charge of the identified individual electrical energy storage systems having a state of charge to be balanced by transmitting, via the identified subset of transmission lines having a lower measure of loading, electrical equalization charges from individual energy storage systems having a relatively high state of charge to individual energy storage systems having a relatively low state of charge.

2. The virtual power plant as claimed in claim 1, wherein:
    the transmission lines electrically connect pairs of the individual energy storage systems of the electrical power plant network; and
    wherein the measuring device detects the equalization charges transmitted by the transmission lines.

3. The virtual power plant as claimed in claim 2, wherein the control device balances charges between energy storage systems by means of specific lines which, prior to said balancing, had transmitted relatively low equalization charges.

4. The virtual power plant as claimed in claim 1, wherein a balancing power transmitted by equalization charges per line of the electrical power plant network is a maximum of 15% of a respective maximum capacity of the transmission line.

5. The virtual power plant as claimed in claim 1, wherein a balancing power transmitted by equalization charges per transmission line is a maximum of 15% of the respective maximum capacity of the energy storage system.

6. The virtual power plant as claimed in claim 1, wherein the control device adjusts a maximum storage capacity of all the energy storage systems in a continuous manner.

7. The virtual power plant as claimed in claim 1, wherein the control device prevents critical ranges for states of charge for all the energy storage systems for states of charge which accelerate ageing.

8. The virtual power plant as claimed in claim 1, further comprising a cloud system including the measuring device and the control device.

9. The virtual power plant as claimed in claim 1, wherein each energy storage system is associated with an electrical load, to which the control device routes the energy delivered by the energy storage system during discharging.

10. The virtual power plant as claimed in claim 1, wherein the measuring device detects an amount of energy delivered in total to each energy storage system during balancing.

11. The virtual power plant as claimed in claim 1, wherein the control device raises a lower state of charge limit by means of a restraining value set on an energy storage system.

12. The virtual power plant as claimed in claim 1, wherein the control device reduces an upper state of charge limit by means of a buffer value set on an energy storage system.

13. The virtual power plant as claimed in claim 1, wherein the control device uses a mathematical algorithm for balancing.

14. The virtual power plant as claimed in claim 1, wherein the control device employs predictive calculations for balancing.

15. The virtual power plant as claimed in claim 1, wherein the control device employs time-dependent power utilization curves of the electrical loads for the balancing.

16. A method for buffering of electric power for electrical loads, including a plurality of spatially distributed electrical energy storage systems electrically interconnected by a plurality of transmission lines of an electrical power plant network, the method comprising:
   detecting the states of charge of each of the energy storage systems, the state of charge of each respective electrical energy storage system representing a percentage charge of a maximum charge value of the respective electrical energy storage system;
   identifying, from the plurality of electrical energy storages, individual electrical energy storage systems having a state of charge to be balanced;
   determining a measure of loading for each of the plurality of transmission lines;
   identifying a subset of the plurality of transmission lines having a lower measure of loading relative to other ones of the transmission lines;
   adjusting the individual states of charge of the identified individual electrical energy storage systems having a state of charge to be balanced by transmitting, via the identified subset of transmission lines having a lower measure of loading, electrical equalization charges from individual energy storage systems having a relatively high state of charge to individual energy storage systems having a relatively low state of charge.

17. The method as claimed in claim 16, wherein the measuring device detects the equalization charges transmitted by the transmission lines which electrically interconnect the energy storage systems in pairs.

18. The method as claimed in claim 17, wherein the control device balances between energy storage systems using transmission lines which had a relatively low level of loading prior to said balancing.

19. The method as claimed in claim 16, wherein the balancing power transmitted by equalization charges per line of the electrical power plant network is a maximum of 15% of a respective maximum capacity of the line.

20. The method as claimed in claim 16, wherein the balancing power transmitted by equalization charges per line of the electrical power plant network is a maximum of 15% of a respective maximum capacity of the energy storage system.

* * * * *